(12) United States Patent
Brethereau et al.

(10) Patent No.: US 7,568,126 B2
(45) Date of Patent: Jul. 28, 2009

(54) CONTROLLED DISPLAY MODE DIAGNOSTIC TOOL FOR COMMUNICATION NETWORKS USING RESULTS OF REAL TESTS AND/OR VALIDATION TESTS

(75) Inventors: Alain Brethereau, Viroflay (FR); Jean-Roch Houllier, Saint-Michel sur Orge (FR); Béatrix De Mathan, Paris (FR)

(73) Assignee: Evolium S.A.S., Paris (FR)

( * ) Notice: Subject to any disclaimer, the term of this patent is extended or adjusted under 35 U.S.C. 154(b) by 409 days.

(21) Appl. No.: 11/447,267

(22) Filed: Jun. 6, 2006

(65) Prior Publication Data

US 2006/0274663 A1 Dec. 7, 2006

(30) Foreign Application Priority Data

Jun. 7, 2005 (FR) ................................. 05 51520

(51) Int. Cl.
*G06F 11/00* (2006.01)
(52) U.S. Cl. ..................................................... 714/26
(58) Field of Classification Search .................. 714/4, 714/26–28, 31, 32, 37, 43, 56
See application file for complete search history.

(56) References Cited

U.S. PATENT DOCUMENTS

| | | | |
|---|---|---|---|
| 5,428,619 A | 6/1995 | Schwartz et al. | |
| 5,539,869 A | 7/1996 | Spoto et al. | |
| 6,396,810 B1* | 5/2002 | Hebel | 370/248 |
| 6,499,117 B1* | 12/2002 | Tanaka | 714/49 |
| 7,016,972 B2* | 3/2006 | Bertram et al. | 709/235 |
| 7,305,466 B1* | 12/2007 | Kaffine et al. | 709/224 |
| 7,310,774 B1* | 12/2007 | Arquie et al. | 715/734 |

FOREIGN PATENT DOCUMENTS

| | | |
|---|---|---|
| EP | 0 413 512 | 2/1991 |
| EP | 1 146 689 | 10/2001 |

\* cited by examiner

*Primary Examiner*—Nadeem Iqbal
(74) *Attorney, Agent, or Firm*—Fay Sharpe LLP (57) ABSTRACT

A communication network diagnosis tool is adapted to analyze network analysis data using diagnostic trees consisting of nodes each associated with a network test or a set of network tests and connected together by branches representing logical relationships between tests to deliver diagnostic reports describing causes of problems in said network. The diagnostic tool comprises i) processor means adapted in the event of using at least a portion of a diagnostic tree for a test to associate with at least some of the nodes and/or links of said portion information data representing the result of the test on the node or link concerned and corresponding to selected levels of importance and ii) display means adapted to display selectively a graphical representation of the nodes and/or links of said portion representing at least a portion of the results of said test as a function of at least one selected level of importance.

19 Claims, 7 Drawing Sheets

CONTROLLED DISPLAY MODE DIAGNOSTIC TOOL FOR COMMUNICATION NETWORKS USING RESULTS OF REAL TESTS AND/OR VALIDATION TESTS

CROSS-REFERENCE TO RELATED APPLICATIONS

This application is based on French Patent Application No. 0551520 filed Jul. 6, 2005, the disclosure of which is hereby incorporated by reference thereto in its entirety, and the priority of which is hereby claimed under 35 U.S.C. §119.

BACKGROUND OF THE INVENTION

1. Field of the invention

The invention relates to communication networks and more particularly to optimizing communication network operation and/or configuration.

2. Description of the Prior art

Because of communication network deployment and operating costs, it is beneficial for communication network operators to optimize network operation and/or configuration frequently. This can enable them to make the best use of the communication resources of their network, in particular taking account of service level agreements that they have entered into with their users, and/or to densify or expand a network.

Optimizing a network and thus managing the use of its resources requires network operation and/or configuration data, referred to as analysis data, for example traffic data that defines the traffic passing through the network elements and network parameters or indicators, for example quality of service (QoS) indicators.

The person skilled in the art is aware that network parameter (or indicator) management is difficult and complex and also continuous in the event of network expansion and/or densification. It necessitates the use of a network optimization system (or tool) such as the Radio Network Optimization (RNO®) system for cellular radio networks developed by Alcatel. A system of this kind can be used to track changes in the quality of service (QoS) in certain network elements, for example cells, to diagnose the causes of problems, in particular quality of service problems, and to propose solutions to those problems.

Some diagnostic tools, including the RNO® tool, use diagnostic trees to produce diagnoses and thus to determine the root causes of a problem. A diagnostic tree is a structure consisting of nodes each associated with one or more tests or analyses of a network under study and linked to each other by branches representing logical relationships between tests called causality relationships. The leaves (or terminations) of a diagnostic tree correspond to particular causes of a problem (causes explaining the origin of a problem), the parent nodes of those leaves correspond to the causes of those particular causes, and so on until the root node of the tree is reached that corresponds to a root cause corresponding to the root problem to be explained.

To determine each particular cause at the origin of a problem (its root cause), the diagnostic tool works up the diagnostic tree that corresponds to that problem from its root node to one or more of its leaf nodes. The test results at each node along the way are deemed to enable each cause of a problem to be determined accurately, in order to be able to solve the problem effectively.

These diagnostic trees are very powerful. However, because the networks are very complex, they are generally very complex to design and to use and it is often difficult to exploit their results.

Moreover, diagnostic trees are rarely the optimum when they are first used in a network, in particular because it is difficult, if not impossible, to test them when they are in progress, given the number of analysis values that must be taken into consideration. Because of this, experts must regularly optimize the diagnostic trees in order to improve their accuracy and enable appropriate corrective action. This optimization, requiring the analysis of very large numbers of diagnostic reports (delivered by the diagnostic tool) and an in-depth knowledge of the operation of the network concerned, can be lengthy and thus delay the discovery of the origin of a network problem and the implementation of the corresponding solution.

Thus an object of the invention is to improve upon this situation, in particular in the case of radiocommunication networks.

SUMMARY OF THE INVENTION

To this end the invention proposes a communication network diagnosis tool adapted to analyze network analysis data using diagnostic trees consisting of nodes each associated with a network test or a set of network tests and connected together by branches representing logical relationships between tests to deliver diagnostic reports describing causes of problems in the network, which diagnostic tool comprises processor means adapted in the event of using at least a portion of a diagnostic tree for a test to associate with at least some of the nodes and/or links of the portion information data representing the result of the test on the node or link concerned and corresponding to selected levels of importance and display means adapted to display selectively a graphical representation of the nodes and/or links of the portion representing at least a portion of the results of the test as a function of at least one selected level of importance.

The diagnostic tool of the invention may have other features and in particular, separately or in combination:

it may comprise control means adapted to perform tests in diagnostic trees in progress and to deliver the results of the tests to the processor means and wherein the display means are adapted to display selectively a graphical representation of the nodes and/or links of at least one tested portion of a diagnostic tree in progress representing at least a portion of the results of the test as a function of at least one selected level of importance;

it may comprise man/machine interface means adapted to enable a user to select a displayed node and to display in response a context-specific menu for accessing at least one description of the selected node and analysis data values used for that node;

its man/machine interface means may be adapted to display (on the screen) a graphical representation of a displayed node and its dependent nodes representing at least a portion of the results of the test on the node and the dependent nodes as a function of at least one selected level of importance;

its man/machine interface means may be adapted to enable a user to place a cursor on a displayed node and to display in response all the information data representing the result of the test on the node;

its man/machine interface means may be adapted to enable user to select a displayed node of a diagnostic tree in progress in order to place a stop marker on that node and then to select at least one analysis data value to be imposed at the level of the selected node and/or at least one other node of the diagnostic tree to which it belongs, in which case the control means are adapted to perform a test on at least one selected node of the diagnostic tree in progress taking account of the analysis data values imposed at each of its nodes and to deliver the results of the test to the processor means in order for at least a portion of the results to be displayed in the form of a graphical representation by the display means;

its man/machine interface means may adapted to enable a user to define at least some of the analysis data values to be imposed and/or to select at least some of the analysis data values from real analysis data values stored in memory means;

its control means may be adapted to perform a test in step by step mode and to communicate the results of each step of the test to the processor means in order for at least a portion of the results of each step to be displayed in the form of a graphical representation (by the display means);

the selected level of importance may initially be the highest level;

the accuracy of the information data may be inversely proportional to the corresponding level of importance;

the information data corresponding to the highest level of importance may be selected from node types, node level test result types, tested analysis data types and types of relationships between adjacent nodes;

the node types may be selected from a first node, a node for which there exists a corrective action proposal, a node for which there exists an external test proposal, a node dedicated exclusively to the test and a node linked to another diagnostic tree;

the different node types may be represented by different geometrical shapes;

the different node level test result types may be selected from a locally positive test, a locally negative test, a locally impossible test and a locally unexecuted test;

the different node level test result types may be represented by different colors;

the different tested analysis data types may be selected, for example, from geographical data, a parameter value, class information, quality of service or traffic data, network topology data and alarms (the above is not an exhaustive list);

the different tested analysis data types may represented by different symbols;

the different types of relationships between adjacent nodes may be represented by different types of line.

The invention is particularly well adapted, although not exclusively so, to radiocommunication networks, especially cellular (or mobile) networks, regardless of their operating standard (for example GSM, GPRS, EDGE, UMTS, WiMax or multistandard networks). It relates generally to any type of communication network, including fixed switched networks (i.e. the "plain old telephone service" (POTS) and public switched telephony network (PSTN)), as well as cable local area networks (LAN) and wireless local area networks (WLAN).

Other features and advantages of the invention will become apparent on reading the following detailed description and examining the appended drawings.

DETAILED DESCRIPTION OF THE PREFERRED EMBODIMENT

The appended drawings constitute part of the description of the invention as well as contributing to the definition of the invention, if necessary.

An object of the invention is to simplify the use and exploitation of results produced by diagnostic trees of communication network diagnostic tools and where appropriate to simplify the design of those diagnostic trees.

The communication network considered by way of non-limiting example hereinafter is a cellular (or mobile) radio network, for example a GSM, GPRS/EDGE, UMTS, WiMax or multistandard network. Consequently, the resources are radio channels. However, the invention is adapted to any type of communication network and in particular switched fixed networks (POTS or PSTN), cable local area networks (LAN) and wireless local area networks (WLAN).

Broadly speaking, a cellular radio network RC may be regarded as a switching network ("Core Network") coupled to a radio access network called a UTRAN in a UMTS network or a BSS in a GSM network itself connected to a network management system NMS. The radio access network includes base stations (a base station is called a Node B in a UMTS network and a base transceiver station (BTS) in a GSM network), and radio network controllers RNC (this refers to a UMTS network; in a GSM network the radio network controllers are known as base station controllers (BSC)). The RNC or BSC are connected to each other and to an access network manager.

The diagnostic tool considered hereinafter by way of nonlimiting example is dedicated to quality of service and therefore has diagnostic trees each associated with one type of quality of service problem. The invention is not limited to this single type of diagnosis, however. It relates to all types of diagnosis that may be effected within a network, and in particular to diagnoses relating to service, for example to quality of service, and diagnoses relating to the network infrastructure, for example the connectivity between cells of a GSM network (management of "handover" (transfer between cells)).

Figure 1:
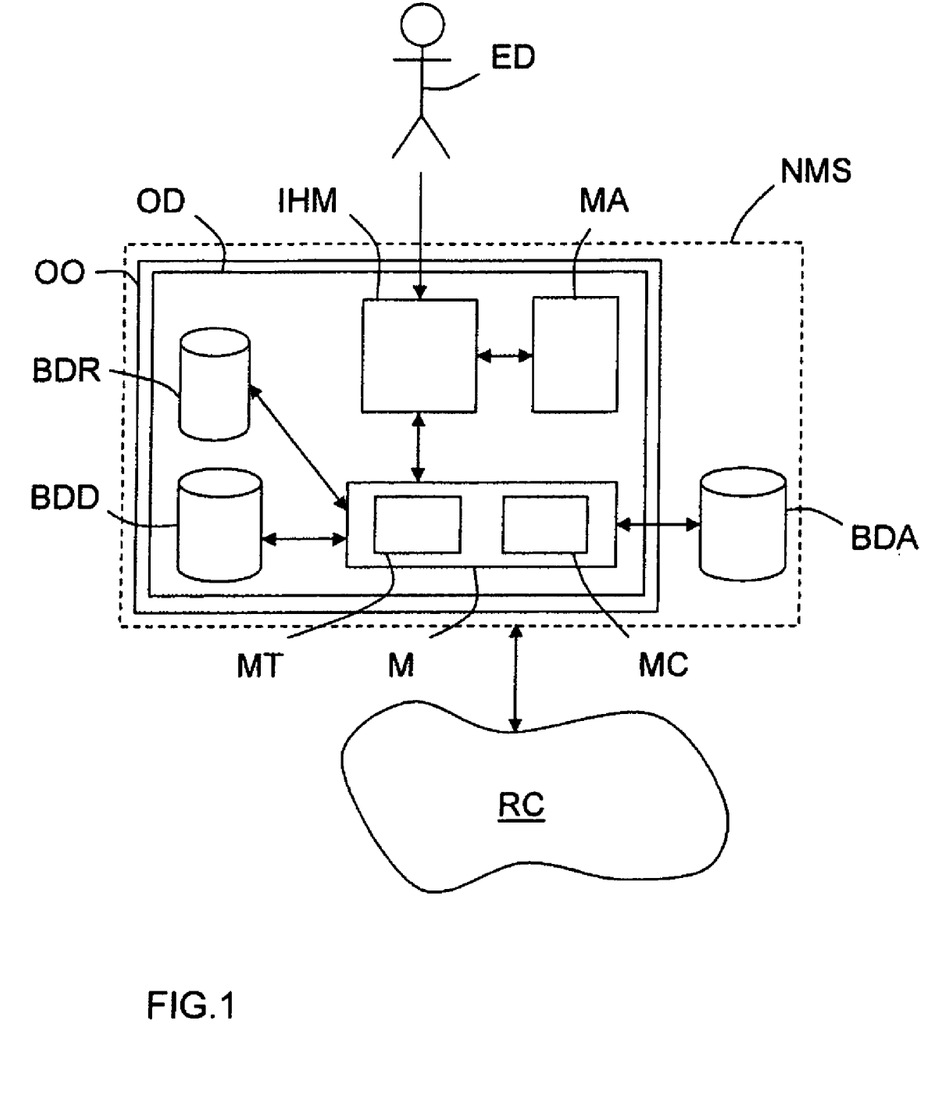
FIG. 1 is a functional block diagram of part of a communication network equipped with a diagnostic tool of the invention installed in a network management system.

FIG. 1 is a diagram of a diagnostic tool OD. A tool of this kind generally comprises a diagnostics database BDD storing data defining diagnostic trees and a diagnostic module (or engine) MD for analyzing operating and/or configuration data for the network RC, called analysis data, in order to deliver diagnostic reports that described causes of problems that have occurred in the network RC.

In the present context the expression "analysis data" refers to traffic data or network parameters or indicators, for example quality of service indicators, the expression "traffic data" refers to values of parameters or indicators that can be measured or estimated by the network management system NMS, and the expression "network element" means any physical and/or logical component of a network through which passes traffic defined locally by parameter or indicator values, for example a cell in which mobile terminals can set up or continue calls or a network equipment such as a router, a base station (Node B or BTS) or a radio network controller (RNC or BSC).

As indicated in the introduction, a diagnostic tree comprises nodes, each of which is associated with one or more network tests, and which are interconnected (in accordance with a "parent-offspring" dependency relationship) by branches that represent logical relationships between tests (causality relationships). The tests are designed to analyze analysis data for a network equipment or for a set of network equipments. The leaf nodes (or terminations) of a diagnostic tree correspond to different possible causes of a given (root) problem concerning the operation or configuration of the network RC. The parent nodes of the leaf nodes correspond to the causes of their causes, and so on until the root node of the diagnostic tree is reached that corresponds to a root cause that is the expression of a given (root) problem.

The data defining the diagnostic trees is generally supplied to the diagnostic database BDD by an expert ED. Analysis data from the network RC is generally stored in an analysis database BDA of the NMS.

The data defining the results of the tests carried out by the diagnostic engine MD are generally stored in a result database BDR.

In the nonlimiting embodiment shown, the diagnostic tool OD is integrated into a network optimization and/or management and/or supervision system (or tool) OO installed on the NMS of the network RC, for example the RNO® system referred to in the introduction. This is not obligatory, however.

According to the invention, the diagnostic tool OD also includes a processor module MT coupled to a display module MA.

Each time that the diagnostic engine MD has used at least a portion of a diagnostic tree to carry out a test on analysis data for the network RC, the processor module MT associates with at least some of the nodes and/or links of that tree portion information data that represents the result of the testing of each node or link concerned and that corresponds to selected levels of importance.

For example, the accuracy of the information data that is associated with a node or a link is inversely proportional to the corresponding level of importance. In other words, the information of the highest level is that which is the most general (and therefore the most representative of a result), other information (of lower levels of importance or more detailed and used more rarely) merely detailing or making more precise those of the highest level of importance.

By way of nonlimiting example, the type of information data that corresponds to the highest level of importance may be the node type, the node test result type, the analysis data tested type, and/or the relationship between adjacent nodes type.

The processor module MT therefore associates level of importance identifiers with information data (or result data) produced by a test. The information data and the associated level of importance identifiers are then stored in the result database BDR in corresponding relationship to the identifiers of the corresponding nodes.

As shown in FIG. 1, the processor module MT is installed in the diagnostic engine MD, for example.

The display module MA selectively displays a graphical representation of the nodes and/or links of the tree portion used that represents at least a portion of the test results, selected as a function of at least one level of importance. To this end it comprises a screen or other display means.

The user may choose the level or levels of importance of the information data to be used for each of the graphical representations to be viewed on his screen. However, it may equally be envisaged that the first graphical representation is automatically constituted from information data corresponding to the highest level, since it is the user who decides on the level of importance of the information data to be used dynamically for subsequent graphical representations.

As shown in FIG. 1, the diagnostic tool OD preferably includes a man/machine interface IHM coupling the diagnostic engine MD (and therefore the processor module MT) to the display module MA. This man/machine interface IHM includes a keyboard for input and a mouse and/or a touch-sensitive screen, for example. It is intended in particular to enable the user to select one or more levels of importance and, as explained hereinafter, to select nodes and/or links and options from context-specific menus.

Figure 2:
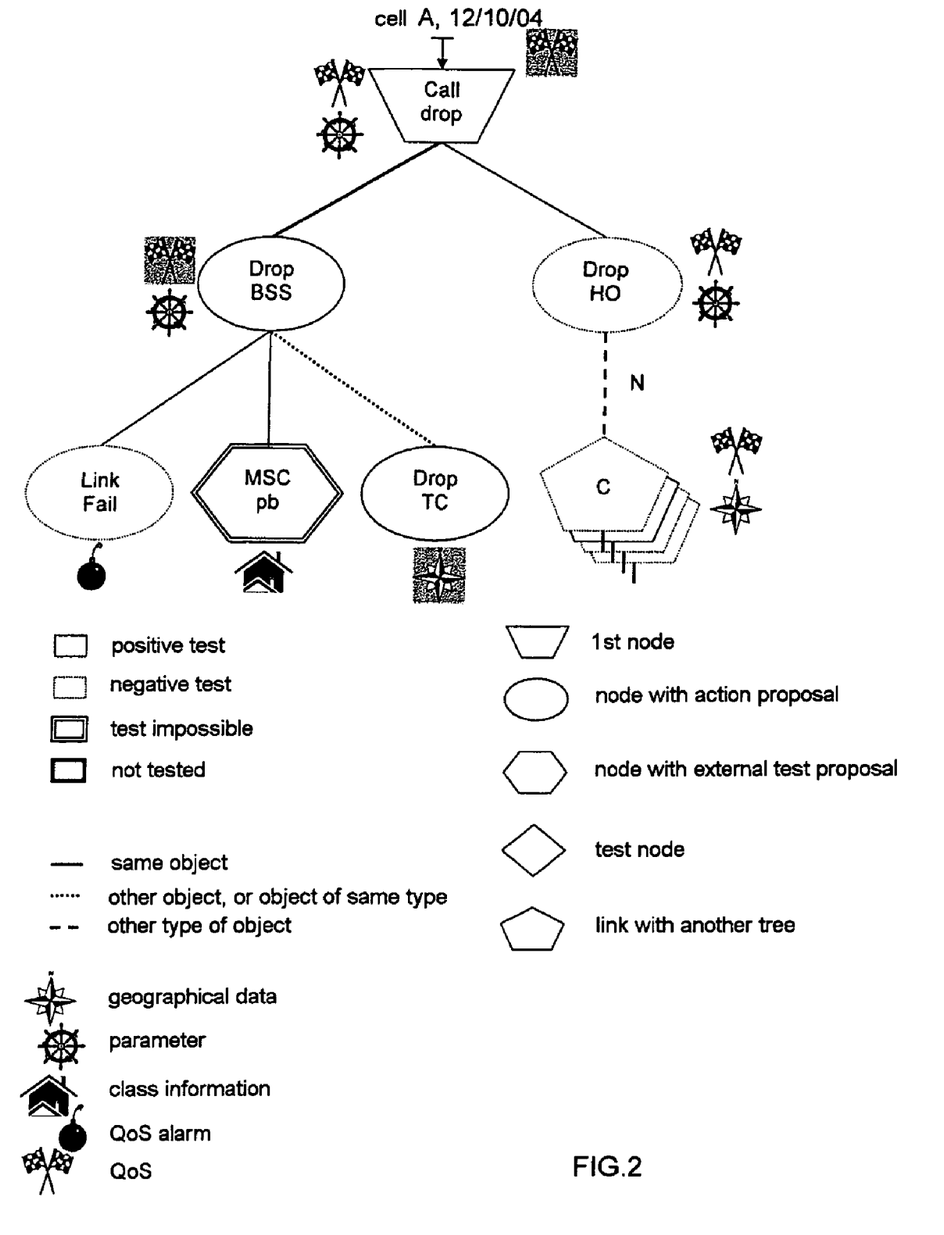
FIG. 2 is a diagram of part of one example of a graphical representation of first level results of a test performed on a network using a diagnostic tree, showing one example of a key defining the conventions used to generate the graphical representation, which uses symbols (and signs) adapted to provide explicit and immediately accessible information.

FIG. 2 is a diagram of one example of a graphical representation of first level (highest level) results of a test performed on a network RC using a diagnostic tree. Only a small portion of the tree is represented. The key under the tree defines one example of a convention used in the FIG. 2 graphical representation and those of FIGS. 3 to 9.

According to this convention:
Nodes are represented by geometrical shapes that differ according to their respective types. For example, the first node of a graphical representation is represented by an "inverted" trapezium, a node for which a corrective action proposal has been determined is represented by an ellipse, a node for which there is an external test proposal is represented by a hexagon, a node dedicated exclusively to a test is represented by a lozenge and a node linked to a diagnostic tree other than that displayed is represented by a pentagon. In the present context the expression "external test" refers to a test that is external to the diagnosis, for example a radio measurement in the field.

In addition to their shape as a function of their type, and their name, nodes may of course be distinguished by the type of test result produced by each of them. For example, the test result types can correspond to different colors or, as shown here, different types of line used to define the geometrical shapes. Thus in the present example a locally positive (successful) test at a node is indicated by a thin line, a locally negative test is indicated by a dotted line, a test that it has been impossible to carry out locally at the node (for lack of data) is indicated by a double line and a test that has not been carried out locally at a node is indicated by a thick line. Different colors can be used instead of different types of line.

Analysis data tested by a node is indicated by signs (or symbols) that differ according to their respective types. For example (see FIG. 2), geographical data is indicated by a compass, a parameter value is indicated by a ship's wheel, class information is indicated by a house, a quality of service alarm is indicated by a bomb and quality of service data is indicated by crossed flags. A node may be associated with one sign (or symbol) or several different signs (or symbols).

The relationships between adjacent nodes are represented by lines that differ according to their respective types. For example, the connection between two adjacent nodes relating to the same object may be represented by a single continuous line, the connection between two adjacent nodes relating to different objects or to the same object type may be represented by a dotted line, and the connection between two adjacent nodes relating to objects of different types may be represented by a discontinuous line. In the present context, the term "object" refers to any network element or network topology element (for example a Node B, a BTS, a cell or an adjacency relationship). Poor quality in respect of a network element may be caused by a problem in another network element, of the same type or a different type (for example, high levels of interference in a cell with heavy traffic will cause a portion of the traffic to be transferred to adjacent cells and may cause congestion in those adjacent cells, or a coding/decoding problem at a BSC may aggravate interference in cells controlled by that BSC).

The above are merely nonlimiting examples of shapes, lines, colors and symbols (or signs) selected from a very large number of different examples, of course. Generally speaking, any type of coding for distinguishing between information data types produced the tests may be envisaged.

It is important to note that in the figures the symbols have been placed alongside the nodes but could equally well be placed inside them.

The diagnostic tree portion shown in FIG. 2 relates to determining the origin of call interruptions in a cell A on Oct. 12, 2004. This is one example of the analysis of a problem with one example of the possible causes tested. Using the conventions cited above, the diagnostic tree portion shown in FIG. 2 comprises:

a "Call drop" node, dedicated to call interruptions, for which the test result is positive and for which information data is available of the quality of service data, alarms, geographical data and parameters types, a "Drop BSS" node, corresponding to call interruptions caused by the radio access network BSS, for which the test result is positive and for which information data is available of the quality of service data, alarms, geographical data and parameters types; this node is connected to the "Call drop" node by a single continuous line indicating that these two nodes relate to the same object, a "Link fail" node, corresponding to connection failures, for which the test result was negative and for which information data is available of the alarms and geographical data types; this node is connected to the "Drop BSS" node by a single continuous line indicating that these two nodes relate to the same object, a "MSC pb" node, corresponding to problems at a call management center (MSC), for which it has not been possible to apply the test; this node is connected to the "Drop BSS" node by a single continuous line indicating that these two nodes relate to the same object, a "Drop TC" node, corresponding to interruptions linked to transcoding carried out in the radio network controllers (RNC or BSC), for which the test result is positive and for which information data of the alarms type is available; this node is connected to the "Drop BSS" node by a dotted line indicating that these two nodes relate to different objects or objects of the same type, a "Drop HO" node, corresponding to call interruptions caused by handovers (transfers between cells), for which the test result is negative and for which information data of the alarms type is available; this node is connected to the "Call drop" node by a single continuous line indicating that these two nodes relate to the same object, and a group of nodes "C" (standing for "coverage"), corresponding to radio continuity problems linked to the coverage of the cells, for three of which the test result is negative and for a fourth of which the test result is positive and for which information data of the alarms type is available; this group of nodes is connected to the "Drop HO" node by a discontinuous line indicating that they relate to objects of different types.

Using the man/machine interface IHM, the user can access all the information data of at least one of the nodes displayed on the screen and data that defines them completely, for example by selecting a node displayed on the screen by placing the mouse cursor over it and where applicable clicking one of the two mouse buttons.

Figure 3:
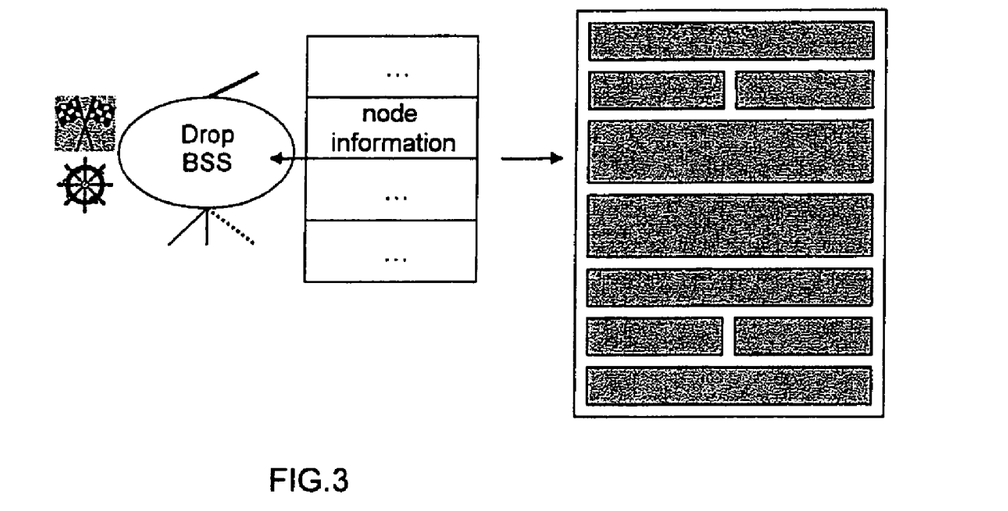
FIG. 3 is a diagram of one example of a graphical representation of a context-specific menu associated with a "Drop BSS" node in FIG. 2 and one example of a graphical representation of an information table corresponding to a "Node information" option of that context-specific menu.

As shown in FIG. 3, selecting a node (here the "Drop BSS" node) by clicking on it with the mouse can display on the screen that node alone and, for example, alongside that node, a context-specific menu offering one or more options. For example, selecting a "Node information" option from the menu displays on the screen a page including fields (grey rectangles) completely defining the node.

The data that is displayed here is not necessarily information data that the processor module MT associates with the node concerned following application of the test or tests to that node and therefore representing the result of the test or tests. It may constitute complementary information.

To produce this display, the man/machine interface IHM accesses the result database BDR or the diagnostic database BDD to extract the required (selected) data stored in corresponding relationship to the identifier of the selected node.

Figure 4:
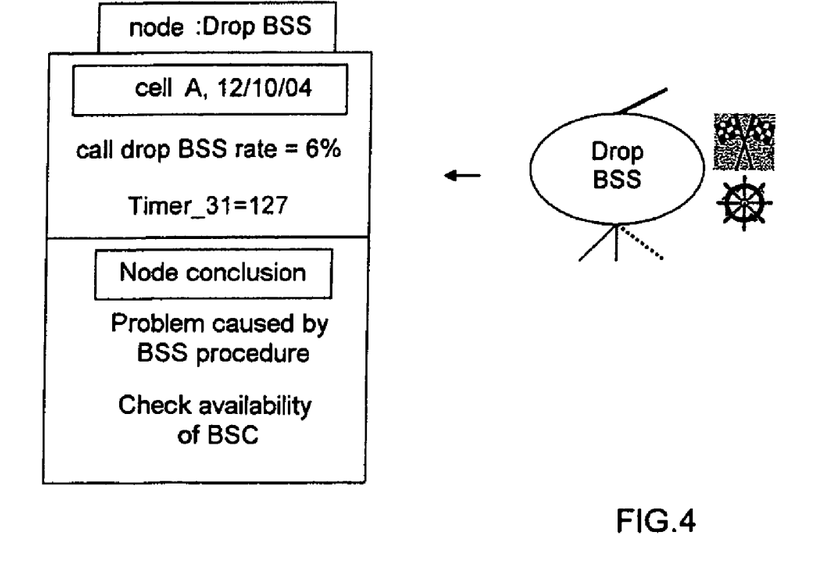
FIG. 4 is a diagram of one example of a graphical representation of second level test results relating to the "Drop BSS" node in FIG. 2.

As shown in FIG. 4, selecting a node (here the "Drop BSS" node) by placing the mouse cursor on it can display on the screen alongside the node windows containing information data of a (second) level of importance below the highest level.

The user then has on his screen all the information data obtained following application of a test to a selected node.

In the example shown in FIG. 4, the window gives i) the name of the selected node ("Drop BSS"), ii) the cell in which the call interruptions occurred (here the cell A) and the date on which they occurred (here Oct. 12, 2004), iii) the indicator (or parameter) analyzed (analysis data item), here the "call drop BSS rate" and the value of that indicator (here equal to 6%), iv) the conclusion as to the origin of the problem (here the BSS is considered to be responsible for the problem), and v) a proposal for action to solve the problem (here it is proposed to check the availability of the BSC radio network controllers).

To obtain this display, the man/machine interface IHM accesses the result database BDR to extract the information data of (second) levels of importance lower than the highest level stored in corresponding relationship to the identifier of the node selected.

Figure 5:
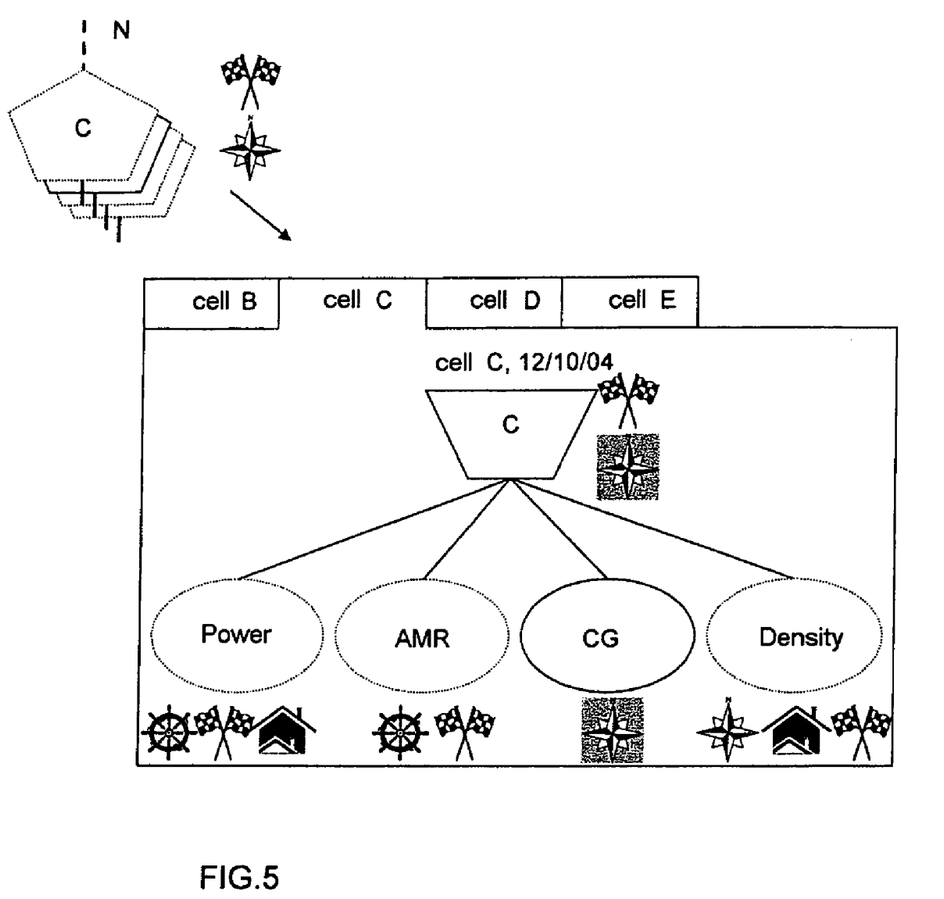
FIG. 5 is a diagram of one example of a graphical representation of a context-specific menu associated with one of the nodes of a group of nodes in FIG. 2, one of which is denoted node "C" (standing for "coverage"); the representation shows the node C for various cells to which the "node C" test is applied.

As shown in FIG. 5, it is also possible to double click with the mouse to select a node from a group of nodes. Here the group of four coverage nodes "C" of the FIG. 6 tree respectively dedicated to the coverages of the cells B, C, D and E was first selected, for example by clicking thereon with one of the mouse buttons. This first selection caused the screen to display a context-specific menu offering access to the graphical representation of the coverage node "C" of one of the four cells B, C, D and E and its dependent nodes. Then, on selecting one of the four cells B, C, D and E, here the cell C, for example by clicking on it with one of the mouse buttons, the screen displays, alongside the group of nodes "C", the graphical representation of the coverage node dedicated to the cell C, the day on which the analysis-diagnosis is carried out, here Oct. 12, 2004, and the dependent nodes.

This latter graphical representation is preferably subject to the same conditions as the first display (see FIG. 2). Accordingly, in the present example, there are displayed on the screen the name of the cell (here the cell C), the date on which the test was carried out (here Oct. 12, 2004), the first node selected ("coverage") and the nodes coupled thereto, here "power", "AMR", "CG" and "density".

The coverage node selected is of the first type, represented by an inverted trapezium, and the result of the test or tests carried out on it is positive (the border is a single continuous line).

The "power" node is dedicated to problems concerning the transmitted power level of the base station (BTS or Node B) of the cell C. The result of the test or tests carried out is negative (the border is a dotted line) and its elliptical representation indicates that it is associated with a corrective action proposition.

The "AMR" node is dedicated to AMR type radio coding problems at the level of the cell C. The result of the test or tests that have been carried out is negative (the border is a dotted line) and its elliptical representation indicates that it is associated with a corrective action proposition.

The "CG" node is dedicated to problems of coverage gaps at the level of the cell C. The result of the test or tests carried out is positive (the border is a single continuous line) and its elliptical representation indicates that it is associated with a corrective action proposition.

The "density" node is dedicated to traffic congestion problems at the level of the cell C. The result of the test or tests carried out is negative (the border is a dotted line) and its elliptical representation indicates that it is associated with a correction action proposition.

It is also possible to access other information data relating to each of the nodes displayed in FIG. 5 and its complementary data (for example its description data) in the manner described above with reference to FIGS. 3 and 4.

As shown in FIG. 1, the diagnostic tool OD of the invention may also include a control module MC for carrying out (validation) tests on diagnostic trees in progress and for delivering the results of those tests to the processor module MT for it to associate them with at least some of the nodes and/or links of the tree concerned in the form of information data and with level of importance identifiers.

If it is appropriate, the information data and the associated level of importance identifiers may be stored in a database, for example in a portion of the result database BDR dedicated to validation, in corresponding relationship to the identifiers of the corresponding nodes. Alternatively, a dedicated memory could be used to store the validation results separately from the real results.

The control module MC is installed in the diagnostic engine MD, for example.

The display module MA and the man/machine interface IHM may be used to display selectively on the screen the graphical representation of the nodes and/or links of at least a tested portion of a diagnostic tree in progress. As in the case of the real results, this graphical representation represents some or all of the results of the test carried out as a function of at least one selected level of importance.

All the above remarks concerning the display of the graphical representations of real results applies equally to validation results. For example, the man/machine interface IHM may enable a user to place his mouse cursor (or any equivalent selection means) on a displayed node in order to display all the information data representing the result of testing that node.

The man/machine interface IHM nevertheless offers additional possibilities in the case of validation.

Figure 6:
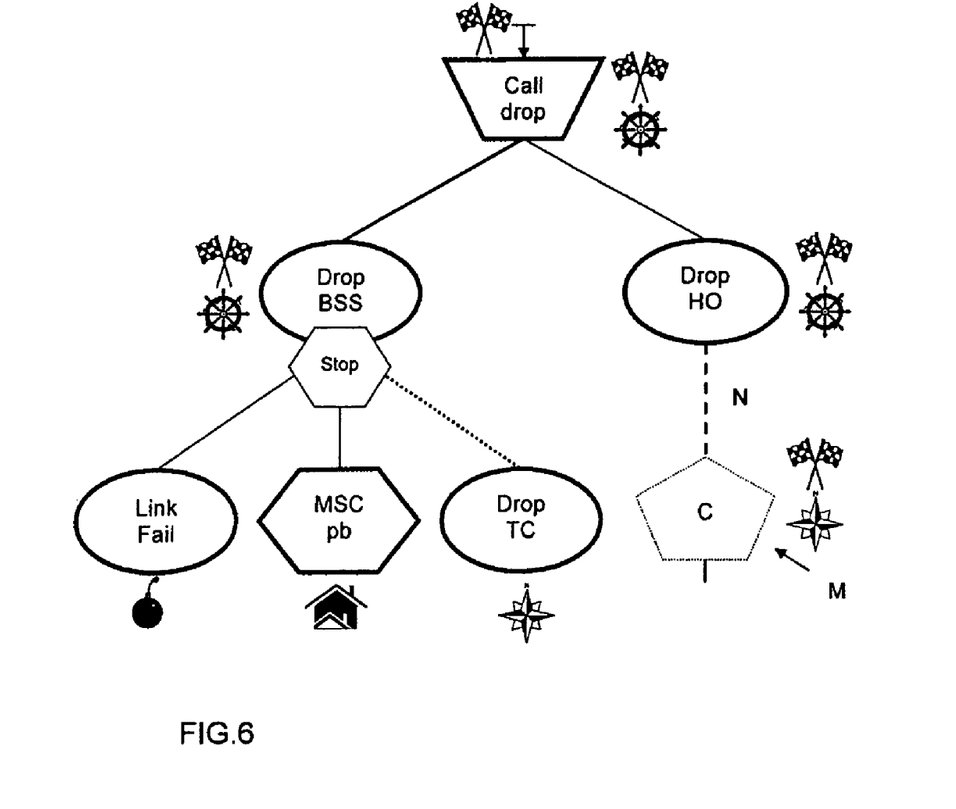
FIG. 6 is a diagram of an example of a graphical representation of first level results of a validation test applied to a node (node "C") of a portion of a diagnostic tree in progress.
Figure 7:
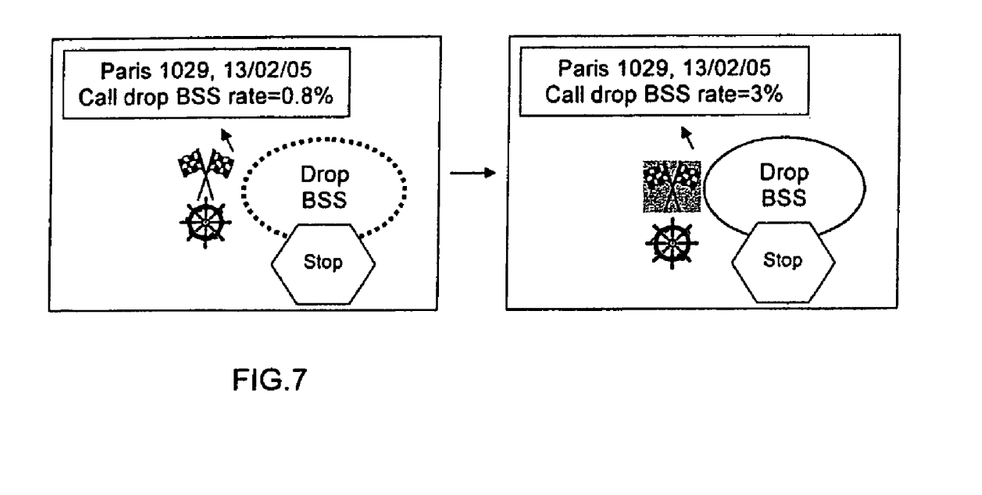
FIG. 7 is a diagram of two examples of a graphical representation of second level results of a validation test applied to a "Drop BSS" node in FIG. 6 for two different values of a "call drop BSS rate" indicator (0.8% and 3%); these two examples show the modification of the value of an indicator ("call drop BSS rate") on a test of a node ("Drop BSS") and the influence of that modification.
Figure 8:
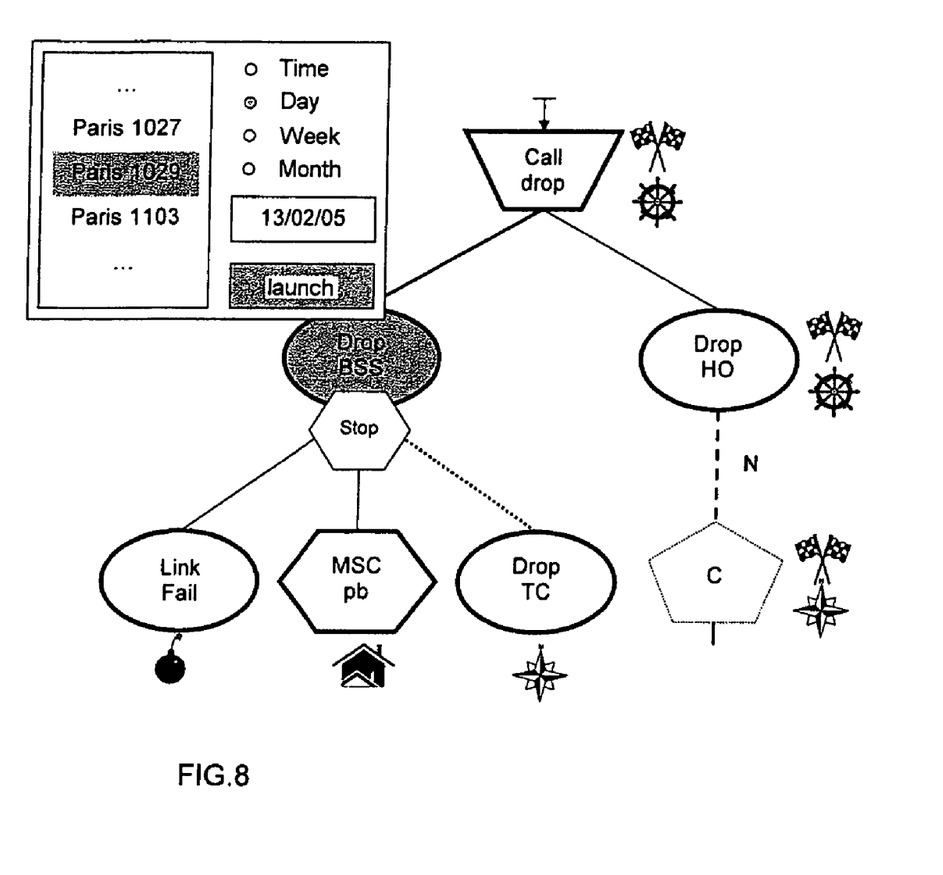
FIG. 8 is a diagram of one example of a graphical representation of a context-specific menu associated with the "Drop BSS" node in FIG. 6.

For example, the man/machine interface IHM can enable a user to select a node of a diagnostic tree in progress (displayed on the screen) in order to place a stop marker at the level of that node and then to select at least one analysis data value to be imposed at the level of the selected node and/or at least one other node of the diagnostic tree to which it belongs. FIGS. 6 to 8 illustrate a situation of this kind.

In the example shown in FIG. 6, the selection tree portion in progress is identical to that described above with reference to FIG. 2. Here the border lines of the geometrical shapes representing the nodes (except for the "C" node) are thick continuous lines because these nodes have not yet been tested.

Here the user decides to select the "Drop BSS" node in order to associate it with a stop marker, here represented by the "Stop" panel. This panel shows where it is wished to stop the analysis to force the analysis of a branch which would otherwise not be analyzed. This can be effected by clicking on the node and then selecting in a "stop marker association" option of a context-specific menu that this calls up, for example.

The user can then force the analysis of a portion (branch) of the diagnostic tree even though there are negative results. This continues the reasoning at the level of this branch (of the corresponding cause and therefore of the chain) although said branch should have been eliminated. To do this, and thus to verify that the diagnosis can identify a problem, the user stops execution at the level of a node. If the field data read does not correspond to the problem under investigation, then that data is modified (by creating a field pseudo-problem) and execution of the diagnosis resumes. In the FIG. 6 example, execution is stopped at the level of the "C" node (cell coverage) that is associated with an analysis value known to yield a negative test result. This is why the geometrical shape representing the "C" node is defined by a dotted line here.

This forcing is intended to test parameter or indicator values (analysis data) specific to the level of at least one of the other nodes of the diagnostic tree in progress.

For example, the user can require the control module MC to test the "Drop BSS" node with a "call drop BSS rate" equal to 0.8%. The user can then request the man/machine interface IHM to display the graphical representation of the result of testing the "Drop BSS" node on the screen. That representation is shown in the left-hand window in FIG. 7. Here it is found that the result of the test is negative because the line defining the geometrical shape that represents the test node is a dotted line.

The user can then impose a new "call drop BSS rate" value (here equal to 3%) using the man/machine interface IHM and then instruct the control module MC to repeat the test or tests on the "Drop BSS" node with the new indicator value. The user can then request the man/machine interface IHM to display on the screen the graphical representation of the result of this new test on the "Drop BSS" node. That representation is shown in the right-hand window of FIG. 7. Here it is found that the test result is positive because the line defining the geometrical shape that represents the test node is a single continuous line.

The analysis data values that are imposed at the level of at least some of the nodes of a diagnostic tree in progress may either be defined by the user via the man/machine interface IHM or selected (or chosen) by the user from real analysis data stored in the analysis database BDA. This enables a scenario (or tree) to compared to reality during its design phase.

FIG. 8 shows one example of selection in the case of a diagnostic tree portion in progress identical to that described above with reference to FIG. 6. Here the user decides to select the "Drop BSS" node in order to associate real analysis data with it. This can be done by clicking on the node and then selecting from the resulting context-specific menu an option to associate real analysis data, for example. The man/machine interface IHM then displays on the screen a window of the type shown in the top left-hand portion of FIG. 8. The user can then use his cursor to select the analysis data to be imposed at the level of the "Drop BSS" node, which data is stored in the analysis database BDA. Here the user decides to select the analysis data obtained for the date Feb. 13, 2005 for the "Paris 1029" cell by selecting (clicking on) the corresponding cell in the list of cells offered and by selecting a date (a time, a day, a week or a month could have been selected instead), and then launches the test or tests with the corresponding value by clicking on the "Launch" icon with the mouse.

The test or tests may be launched either at the level of the node of the diagnostic tree in progress for which analysis data values have just been imposed or at the level of a node on the upstream side of the latter node.

Figure 9:
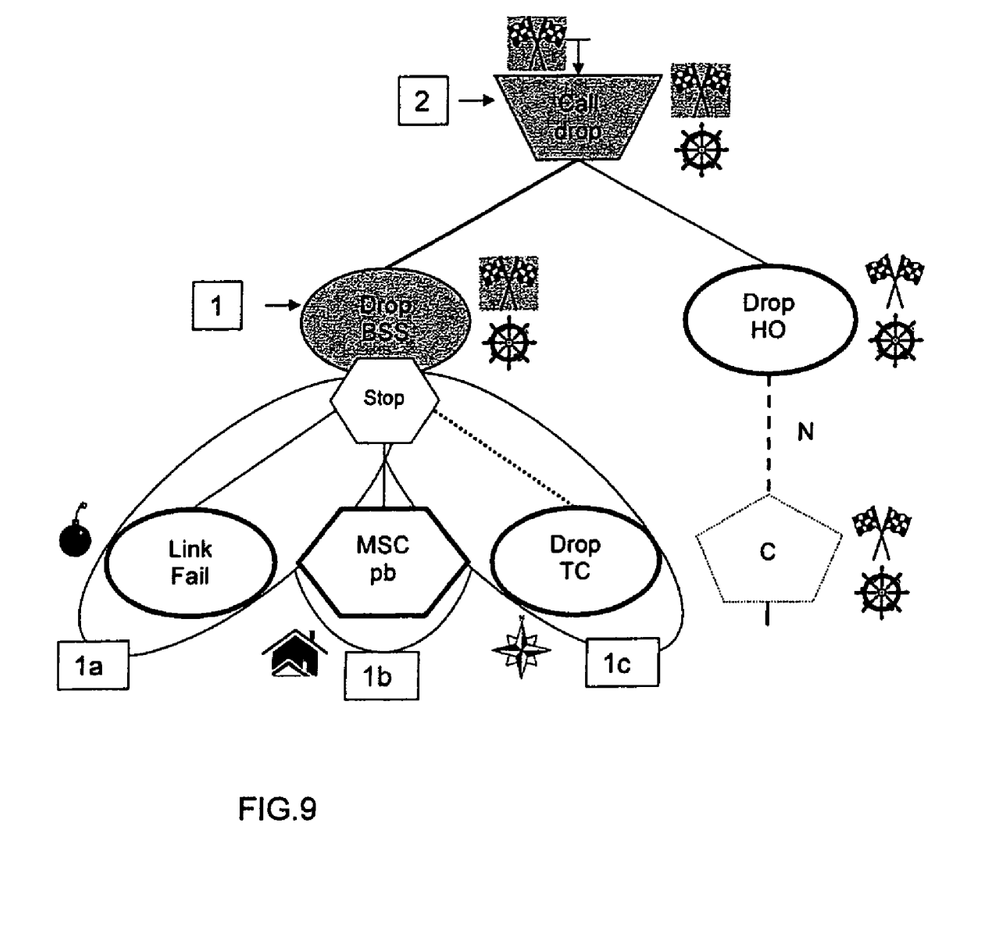
FIG. 9 is a diagram of one example of a graphical representation of first level results of a validation test effected in step by step mode with the diagnostic tree portion in progress shown in FIG. 6.

The test or tests may be launched in step by step mode, as shown in FIG. 9. To be more precise, in the step by step mode the nodes that are coupled to an upstream node can be used one after the other, followed by working back one level in the upstream direction in order to relaunch all the tests. In the example shown in FIG. 9, the "Link fail" node (1a) is used first, then the "MSC pb" node (1b), and then the "Drop TC" node (1c), taking account of the imposed analysis data values, after which all of the tests are repeated at the level of the "Call drop" node (2).

The branches of a diagnostic tree in progress can be tested one after the other in this way and its design and future use thereby optimized.

Although this is not shown in FIG. 1, the diagnostic tool OD preferably includes all the usual debugger (error detection and resolution) functions.

The processor module MT, a portion of the display module MA, a portion of the man/machine interface IHM and the control module MC, if any, of the diagnostic tool OD may take the form of electronic circuits, software (or electronic data processing) modules or a combination of circuits and software.

The invention is not limited to the diagnostic tool embodiments described above by way of example only and encompasses all variants that the person skilled in the art might envisage that fall within the scope of the following claims.

There is claimed:

1. A communication network diagnosis tool adapted to analyze network analysis data using diagnostic trees consisting of nodes each associated with a network test or a set of network tests and connected together by branches representing logical relationships between tests to deliver diagnostic reports describing causes of problems in said network, which diagnostic tool comprises:

processor means that uses at least a portion of a diagnostic tree for a test to associate, with at least some of the nodes and/or links of said portion, information data representing the result of the test on the node or link concerned and corresponding to selected levels of importance, and display means adapted to display selectively a graphical representation of the nodes and/or links of said portion representing at least a portion of the results of said test as a function of at least one selected level of importance; and man/machine interface means adapted to enable a user to select a displayed node and to display in response a context-specific menu for accessing at least one description of said selected node and analysis data values used for that node.

2. A diagnostic tool according to claim 1, comprising control means adapted to perform tests in diagnostic trees in progress and to deliver the results of said tests to said processor means and wherein said display means are adapted to display selectively a graphical representation of the nodes and/or links of at least one tested portion of a diagnostic tree in progress representing at least a portion of the results of said test as a function of at least one selected level of importance.

3. A diagnostic tool according to claim 1, wherein said man/machine interface means are adapted to display a graphical representation of a displayed node and its dependent nodes representing at least a portion of the results of said test on said node and said dependent nodes as a function of at least one selected level of importance.

4. A diagnostic tool according to claim 1, wherein said man/machine interface means are adapted to enable a user to place a cursor on a displayed node and to display in response all the information data representing the result of the test on said node.

5. A diagnostic tool according to claim 1, wherein said man/machine interface means are adapted to enable user to select a displayed node of a diagnostic tree in progress in order to place a stop marker on that node and then to select at least one analysis data value to be imposed at the level of the selected node and/or at least one other node of the diagnostic tree to which it belongs and wherein said control means are adapted to perform a test on at least one selected node of said diagnostic tree in progress taking account of the analysis data values imposed at each of its nodes and to deliver the results of said test to said processor means in order for at least a portion of said results to be displayed in the form of a graphical representation by said display means.

6. A diagnostic tool according to claim 5, wherein said man/machine interface means are adapted to enable a user to define at least some of the analysis data values to be imposed and/or to select at least some of the analysis data values from real analysis data values stored in memory means.

7. A diagnostic tool according to claim 5, wherein said control means are adapted to perform a test in step by step mode and to communicate the results of each step of said test to said processor means in order for at least a portion of the results of each step to be displayed in the form of a graphical representation by said display means.

8. A diagnostic tool according to claim 1, wherein said selected level of importance is initially the highest level.

9. A diagnostic tool according to claim 8, wherein the accuracy of the information data is inversely proportional to the corresponding level of importance.

10. A diagnostic tool according to claim 8, wherein the information data corresponding to the highest level of importance is selected from a group including node types, node level test result types, tested analysis data types and types of relationships between adjacent nodes.

11. A diagnostic tool according to claim 10, wherein the node types are selected from a group including a first node, a node for which there exists a corrective action proposal, a node for which there exists an external test proposal, a node dedicated exclusively to the test and a node linked to another diagnostic tree.

12. A diagnostic tool according to claim 10, wherein the different node types are represented by different geometrical shapes.

13. A diagnostic tool according to claim 10, wherein the different node level test result types are selected from a group including a locally positive test, a locally negative test, a locally impossible test and a locally unexecuted test.

14. A diagnostic tool according to claim 10, wherein the different node level test result types are represented by different colors.

15. A diagnostic tool according to claim 10, wherein the different tested analysis data types are selected from a group including geographical data, a parameter value, class information, quality of service or traffic data, network topology data and alarms.

16. A diagnostic tool according to claim 10, wherein the different tested analysis data types are represented by different symbols.

17. A diagnostic tool according to claim 10, wherein the different types of relationships between adjacent nodes are represented by different types of line.

18. A communication network diagnosis tool adapted to analyze network analysis data using diagnostic trees consisting of nodes each associated with a network test or a set of network tests and connected together by branches representing logical relationships between tests to deliver diagnostic reports describing causes of problems in said network, which diagnostic tool comprises:
  processor means that uses at least a portion of a diagnostic tree for a test to associate, with at least some of the nodes and/or links of said portion, information data representing the result of the test on the node or link concerned and corresponding to selected levels of importance, and display means adapted to display selectively a graphical representation of the nodes and/or links of said portion representing at least a portion of the results of said test as a function of at least one selected level of importance;
  wherein said selected level of importance is initially at a highest level.

19. A communication network diagnosis tool adapted to analyze network analysis data using diagnostic trees consisting of nodes each associated with a network test or a set of network tests and connected together by branches representing logical relationships between tests to deliver diagnostic reports describing causes of problems in said network, which diagnostic tool comprises:
  processor means that uses at least a portion of a diagnostic tree for a test to associate, with at least some of the nodes and/or links of said portion, information data representing the result of the test on the node or link concerned and corresponding to selected levels of importance, and display means adapted to display selectively a graphical representation of the nodes and/or links of said portion representing at least a portion of the results of said test as a function of at least one selected level of importance;
  wherein a level of detail of the information data is inversely proportional to the corresponding level of importance.

* * * * *